United States Patent
McLlroy et al.

(10) Patent No.: US 6,701,521 B1
(45) Date of Patent: Mar. 2, 2004

(54) MODULAR CONFIGURATION AND DISTRIBUTION OF APPLICATIONS CUSTOMIZED FOR A REQUESTOR DEVICE

(75) Inventors: Guy McLlroy, Sunnyvale, CA (US); Roger Flores, Redwood City, CA (US); Steve Lemke, Sunnyvale, CA (US)

(73) Assignee: Palm Source, Inc., Sunnyvale, CA (US)

( * ) Notice: Subject to any disclaimer, the term of this patent is extended or adjusted under 35 U.S.C. 154(b) by 0 days.

(21) Appl. No.: 09/580,271

(22) Filed: May 25, 2000

(51) Int. Cl.[7] .............................................. G06F 9/445
(52) U.S. Cl. ...................................... 717/173; 717/178
(58) Field of Search ................................. 717/168–178; 705/52; 709/200–253, 310–319

(56) References Cited

U.S. PATENT DOCUMENTS

| | | | | |
|---|---|---|---|---|
| 6,067,582 A | * | 5/2000 | Smith et al. ..................... | 710/5 |
| 6,178,551 B1 | * | 1/2001 | Sana et al. ................... | 717/140 |
| 6,347,398 B1 | * | 2/2002 | Parthasarathy et al. ..... | 717/178 |
| 6,374,402 B1 | * | 4/2002 | Schmeidler et al. ........ | 717/167 |
| 6,389,403 B1 | * | 5/2002 | Dorak, Jr. ..................... | 705/52 |
| 6,496,979 B1 | * | 12/2002 | Chen et al. ................. | 717/178 |

* cited by examiner

Primary Examiner—Wei Zhen

(74) Attorney, Agent, or Firm—Wagner, Murabito, & Hao LLP

(57) ABSTRACT

A system and method for installing an application on a client device (e.g., a palmtop computer system) communicatively coupled to a host device (e.g., a host computer system). Instead of transferring an application to the client device from another client device, the client device receives a description of the application from the other client device. When the client device and the host device are synchronized, the description is automatically communicated by the client device to the host device, which is also in communication with a source (e.g., an application source). Additional information, such as the type of hardware or the type of operating system used by the client device, is also automatically communicated to the host device by the client device. The host device communicates to the source a specification comprising the description of the application as well as the additional information pertaining to the client device. The host device receives from the source a software element (e.g., a component, object or file for the application, or the application itself) characterized by the specification. The host device automatically makes the software element ready for installation on the client device. The software element is then installed on the client device when the host device and the client device are subsequently synchronized. The process of identifying and retrieving an application and making it ready for installation is performed automatically without user intervention, thereby simplifying for users the process of finding and downloading applications onto the client device.

18 Claims, 17 Drawing Sheets

MODULAR CONFIGURATION AND DISTRIBUTION OF APPLICATIONS CUSTOMIZED FOR A REQUESTOR DEVICE

BACKGROUND OF THE INVENTION

1. Field of the Invention

The present invention relates to the field of data processing systems. Specifically, the present invention relates to a method and system for automatically selecting and installing an application onto a portable (e.g., palmtop) computer system.

2. Related Art

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

The portability and convenience of palmtops has made it increasingly desirable to increase the number and types of applications that can be run on them. It is advantageous to expand the capabilities of a palmtop so that it can provide many of the same, if not the same, services provided by a desktop or laptop computer system, particularly with regard to access to the World Wide Web (WWW). As such, information currently available via the Internet using personal computers, such as on-line access to news and financial information, can also be provided via a palmtop. In addition, a palmtop can be used for electronic mail ("e-mail") and multi-player gaming, and features such as voice recognition can also be added.

It has proven to be convenient to exchange data and information between a host computer and a palmtop computer using a communication interface, such as a serial or parallel input port. It has also proven to be convenient to transfer an application installed on one palmtop computer to another palmtop. Accordingly, many palmtop computers include an infrared communication port that can be used for transmitting data and applications between palmtops (commonly known as "beaming"). Beaming applications from one palmtop to another has proven to be popular among users.

The portability and convenience of palmtops comes with a tradeoff in processing power and memory space. Processing issues can be addressed in part using processors that are smaller and faster than preceding generations, and innovative techniques are also available to store data and information more densely in smaller places. Still, processing and data storage issues may be present due to the size of the operating system needed to support the various applications loaded on the palmtop.

As the number and, in particular, the variety of applications increase, the operating system needed to run those applications increases in complexity and correspondingly in size. The traditional model for generic, limited resource devices such as palmtops is that a memory image is built and installed on the device. The memory image provides a certain set of abstract operating system services for the applications on the device. However, as the application set expands and becomes more diverse, the operating system needs to grow in size and abstraction and as a result uses a greater portion of the resources available in the device.

In addition, many applications today utilize the well-known Component Object Model (COM) software architecture as well as other well-known architectures such as Common Object Request Broker Architecture (CORBA), Distributed COM (DCOM), and Distributed Computing Environment (DCE). COM is based on software objects or modules that are well encapsulated and accessed through interfaces provided by services such as Object Linking and Embedding (OLE) and ActiveX. COM objects can interoperate with other COM components through their interfaces. In this way, COM allows applications to be built from different components.

Thus, with a COM-based architecture, the operating system on the palmtop provides services supporting the execution of an application, in essence building the application by defining and implementing interfaces and modules between its various COM components when the application is called. Accordingly, with COM applications, further complexity is added to the operating system, requiring more coding and hence more memory.

A recent technique for reducing the memory space needed for the operating system is to build and load the operating system memory image when the palmtop is coupled to a host computer system during a synchronization process ("sync-time image binding"). Typically, the palmtop is placed into a device, such as a cradle, that is communicatively coupled to the host computer system via a serial or parallel input port. The synchronization process is used to allow the computer system and the palmtop to share information such as applications and databases. With the sync-time image binding technique, the operating system is configured so that it includes only the specific code and resources required to support the palmtop and the applications installed on the palmtop. Thus, software/code or resources not required by the palmtop or its applications are not installed, thereby saving memory space.

However, the sync-time image binding technique can cause a problem when a user wishes to add an application to his/her palmtop by beaming the application from another palmtop. While the palmtop acting as the source of the application will have the operating system code and resources needed to support the application, the palmtop receiving the application may not. Thus, the application may be satisfactorily received, but the application cannot be used.

In addition, the palmtops may have different hardware that prevents operation of an application beamed from one palmtop to another. For example, the processors used by the palmtops may be different, and so each palmtop may require a different version of the same application that is compatible with their processor. Similarly, one palmtop may use a monochrome display device and the other may use a color display device. A version of an application specifically designed for a color display may not function as well with a monochrome display, or vice versa. Under these circumstances, the application can likely be beamed from one palmtop to the other, but it may not be able to function to its fullest capabilities on the palmtop receiving the application.

Another disadvantage associated with beaming is that, in those cases where the application is being sold or where licensing agreements do not permit the application to be freely shared, beaming an application between compatible palmtops can provide a ready method for circumventing the commercial and intellectual property interests of a distributor or vendor for the application. In other words, copies of the application can be beamed and thereby distributed between palmtops without having to purchase the application or otherwise compensate the entity that owns the intellectual property rights to the application.

When an application cannot be beamed from one palmtop to another because, for instance, the palmtops do not share compatible hardware or software, or because the application is not available from another palmtop, a user can instead locate the application on his/her own and then install the application by synchronizing the palmtop to a host computer system. However, there are also disadvantages to installing an application onto a palmtop in this manner. First, the application must be located, both at its source and later at a location within the host computer system. For example, if the application is obtained from an external source such as a site on the WWW, the Uniform Resource Locator for the application must be determined and properly entered so that the application can be found. Once the application is located, the proper version must be selected. For example, the user must select the version that is compatible with the hardware and software capabilities of his/her palmtop. Next, the application is downloaded onto the computer system from the WWW, given a file name, and stored somewhere in the computer system. The user must then locate the file in computer system memory.

Typically, the file is in a compressed format, so the user must locate the proper software for decompressing the file according to the compression scheme used, and then execute that software. Once decompressed, the file has to be tagged in some manner to indicate that it is to be downloaded onto the palmtop during a subsequent synchronization. In one implementation, the user accomplishes this by dragging the file into a window; files in that window are installed at the next synchronization between the computer system and the palmtop.

Thus, the process for installing an application onto a palmtop via a host computer system can be somewhat complex and tedious, and is also prone to error. For an occasional user not familiar with the particulars of locating, downloading and decompressing files, or not familiar with the specific hardware and software configurations of his/her palmtop, the task of installing a new application may to be a challenge. Such users may be inclined to avoid installing new application onto their palmtops, or perhaps will steer clear of palmtops altogether. Even experienced users may be daunted by the involved process for installing a new application onto a palmtop.

SUMMARY OF THE INVENTION

Accordingly, what is needed is a system and/or method that can allow an application installed on one palmtop to be readily installed on another palmtop, in particular in those instances in which a functioning version of the application cannot be beamed from one palmtop to the other (because, for example, the hardware or the operating systems are not compatible between the palmtops). What is also needed is a system and/or method that can satisfy the above need and that can provide a user-friendly mechanism for locating a version of the application proper for a particular type of palmtop, and for installing the application onto the palmtop. In addition, what is needed is a system and/or method that can satisfy the above needs and that can, when so desired, provide a mechanism for providing billing information associated with installing the application onto a palmtop. The present invention provides these advantages and others not specifically mentioned above but described in the sections to follow.

A method and system are described for installing an application on a client device, such as a portable (or palmtop) computer system. In the present embodiment, instead of transferring the application to the client device from another client device, the client device receives a description of the application from the other client device. When a host device (e.g., a host computer system) and the client device are synchronized, the description is automatically communicated from the client device to the host device, which is also in communication with a source of applications. In one embodiment, the host device is in communication with a site on the World Wide Web. In another embodiment, the source of applications is a site on an intranet. In yet another embodiment, the application source is a data storage device such as a magnetic or optical disk.

In the present embodiment, hardware and software attributes of the client device can also be automatically communicated to the host device by the client device. The host device automatically communicates to the application source a specification comprising the description of the application as well as the attributes of the client device. The host device receives from the source one or more software elements (e.g., a component, object or file, or the application itself) characterized by the specification. The host device automatically makes the software element(s) ready for installation on the client device. The software element(s) are then installed on the client device when the host device and the client device are subsequently synchronized.

In one embodiment, the description of the application is transferred to the client device from the other client device using a wireless link (e.g., an infrared beam). In various embodiments, the description of the application can include a version number for the application, a vendor or application name, a description of the software elements (e.g., components, files or objects) needed to build the application, or a location of these software elements (e.g., a Uniform Resource Locator) or of the application itself.

In other embodiments, the attributes of the client device considered in the specification can include the type of processor, the type of display device (e.g., color or monochrome), or the type of operating system used by the client device, or the amount of memory space available in the client device.

In another embodiment, billing and payment information can be provided to the host device from the application source along with the software elements for the application.

In yet another embodiment, the software elements can be automatically decompressed (when they are in a compressed format) and tagged to indicate they are to be installed on the client device during a subsequent synchronization of the host and client devices.

The present invention thus provides a user-friendly method of transferring an application from one palmtop to another, such as for those cases in which the application as configured for one palmtop is not compatible with the hardware or software used by the other palmtop. The process of identifying and retrieving the appropriate version of an application and making the application ready for installation can be performed automatically, substantially without user intervention. The user does not have to know the particulars of the application to be installed or of the hardware and software used by his/her palmtop. The user also does not need to intervene in order to prepare the application for installation. The present invention therefore simplifies for users the process of finding an application, selecting the proper version, and downloading the application onto the palmtop.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying" or "including" or "installing" or "receiving" or "transferring" or "communicating" or "making" or "decompressing" or "displaying" or "determining" or "synchronizing" or "accessing" or "retrieving" or the like, refer to the action and processes of a computer system (e.g., processes 1100 and 1400 of FIGS. 11 and 14, respectively), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Platform

Figure 1A:
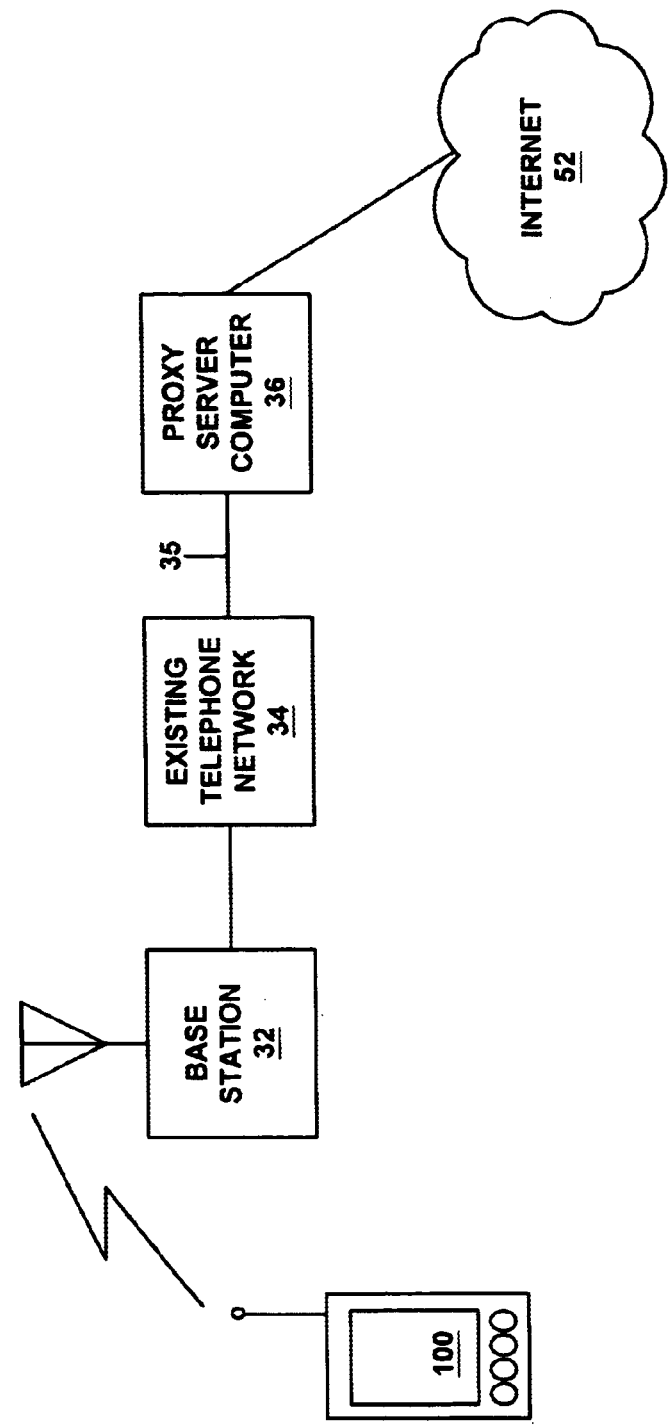
FIG. 1A is a block diagram of an exemplary network environment including a portable computer system in accordance with one embodiment of the present invention.

FIG. 1A is a block diagram of an exemplary network environment 50 including a portable computer system 100 in accordance with one embodiment of the present invention. Portable computer system 100 is also known as a palmtop or palm-sized computer system. In one embodiment, portable computer system 100 has the ability to transmit and receive data and information over a wireless communication interface (e.g., a radio interface).

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

Figure 1B:
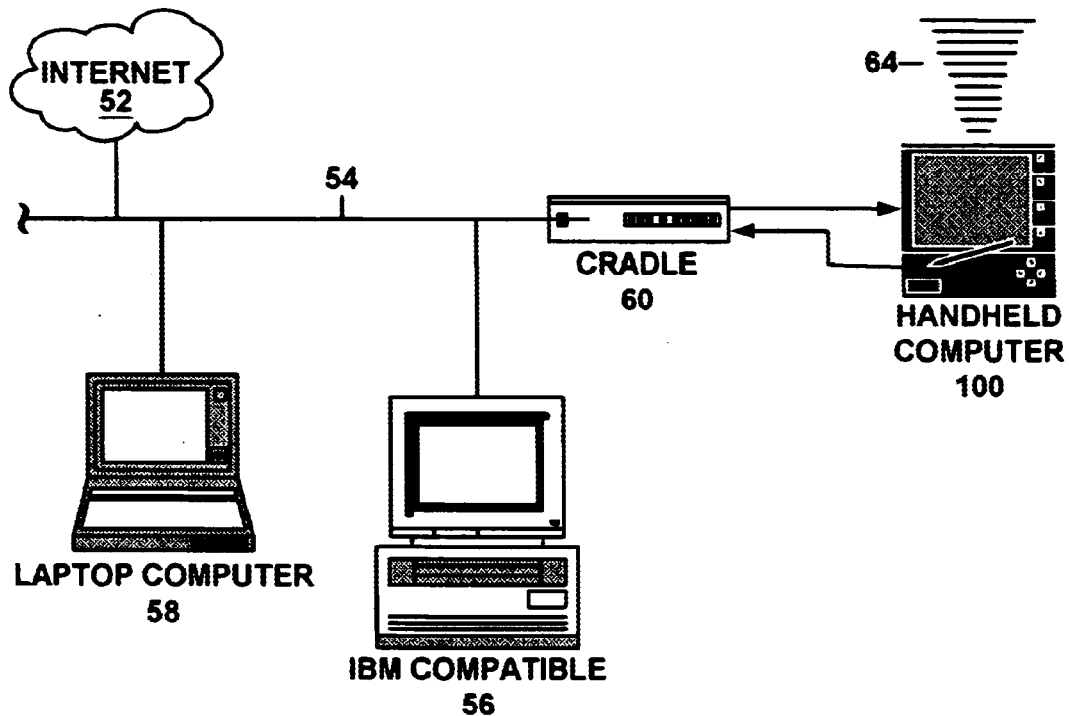
FIG. 1B is a block diagram of a portable computer system connected to other computer systems and the Internet via a cradle device in accordance with one embodiment of the present invention.

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100 ("handheld computer") of the present invention. Cradle 60 provides an electrical and mechanical communication interface between bus 54 (and anything coupled to bus 54) and the computer system 100 for two-way communications. It is appreciated that, in accordance with the present invention, portable computer system 100 may instead be coupled to host computer systems 56 and 58 via a wireless (radio) connection. Computer system 100 also contains a wireless infrared communication mechanism 64 for sending and receiving information from other devices.

With reference to both FIGS. 1A and 1B, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 2:
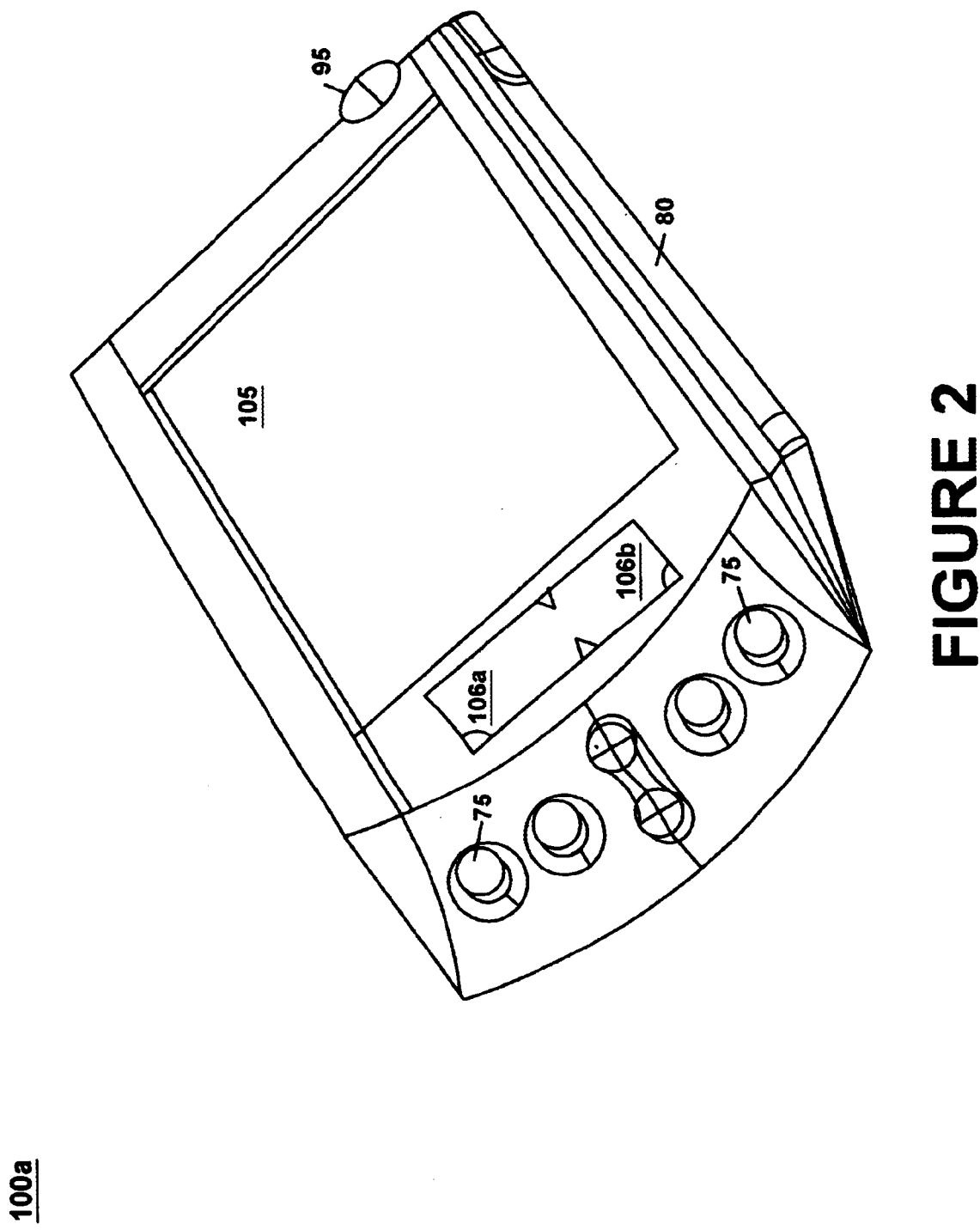
FIG. 2 is a top side perspective view of a portable computer system in accordance with one embodiment of the present invention.

FIG. 2 is a perspective illustration of the top face 100*a* of one embodiment of the palmtop computer system 100 of the present invention. The top face 100*a* contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100*a* also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106*a* and 106*b*. Region 106*a* is for the drawing of alphabetic characters therein (and not for numeric characters) for automatic recognition, and region 106*b* is for the drawing of numeric characters therein (and not for alphabetic characters) for automatic recognition. The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

Figure 3:
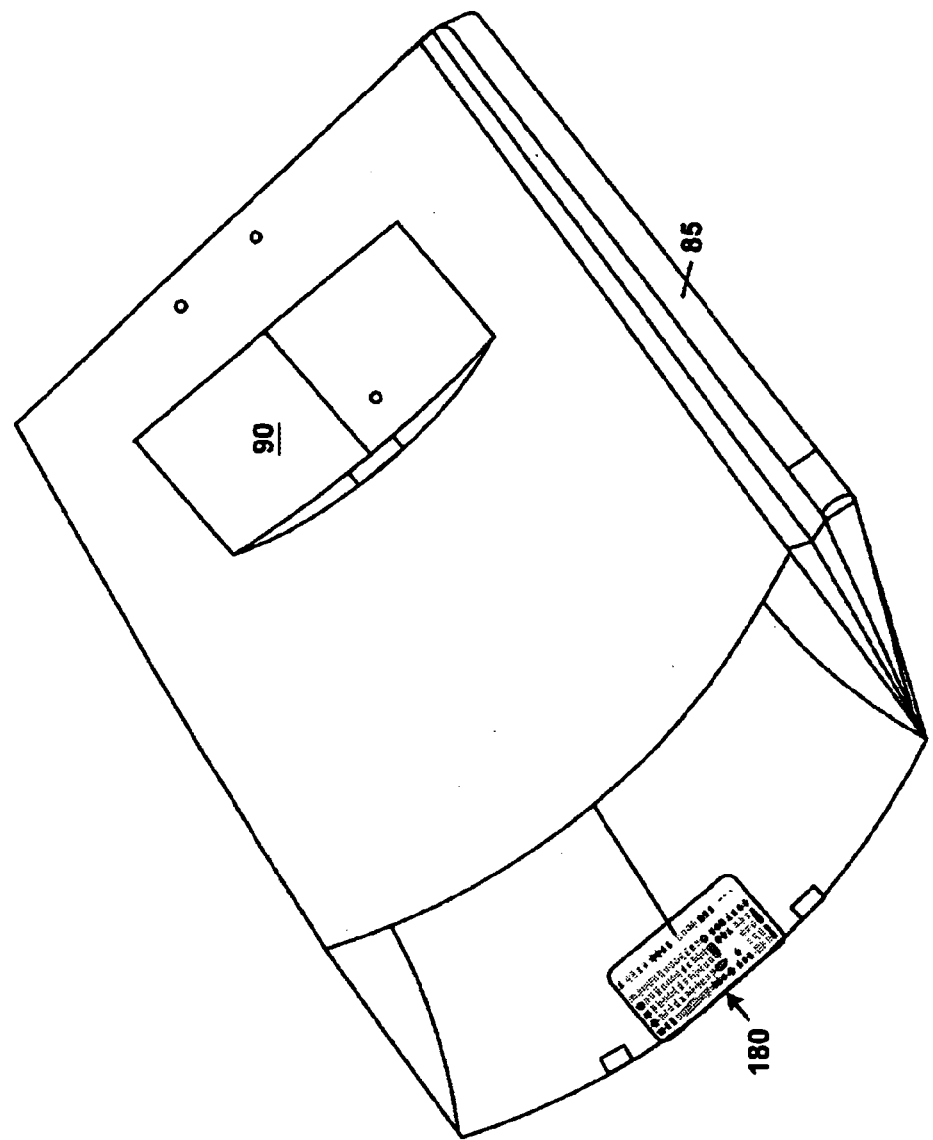
FIG. 3 is a bottom side perspective view of the portable computer system of FIG. 2.

FIG. 3 illustrates the bottom side 100*b* of one embodiment of the palmtop computer system that can be used in accordance with various embodiments of the present invention. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE1394), Ethernet, etc.

Figure 4:
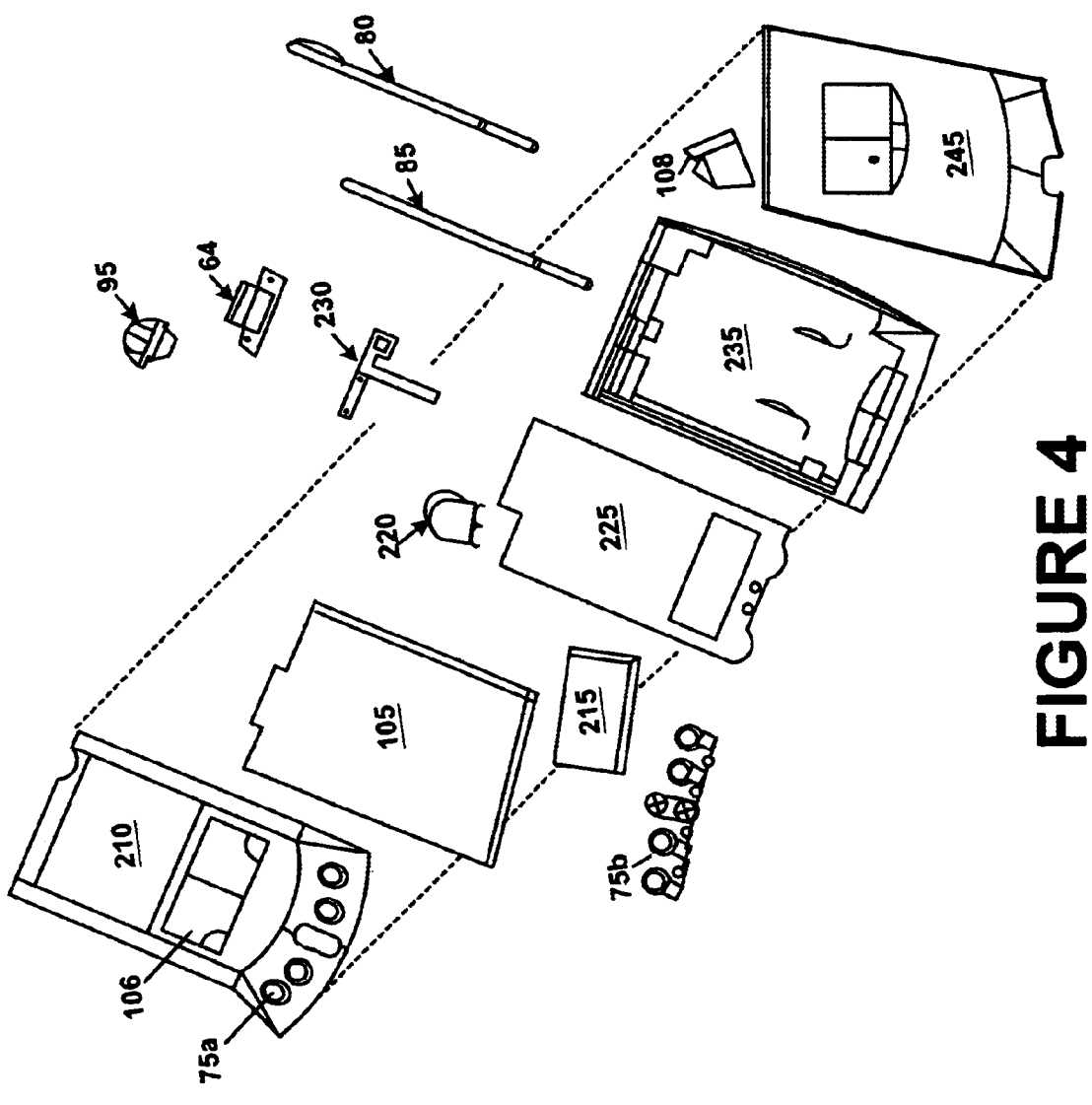
FIG. 4 is an exploded view of the components of the portable computer system of FIG. 2.

FIG. 4 is an exploded view of the palmtop computer system 100 in accordance with one implementation. Computer system 100 contains a back cover 245, and a front cover 210 having an outline of region 106 and holes 75*a* for receiving buttons 75*b*. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between computer system 100 and other networked computers and/or the Internet via a proxy server (see FIG. 1A).

Figure 5:
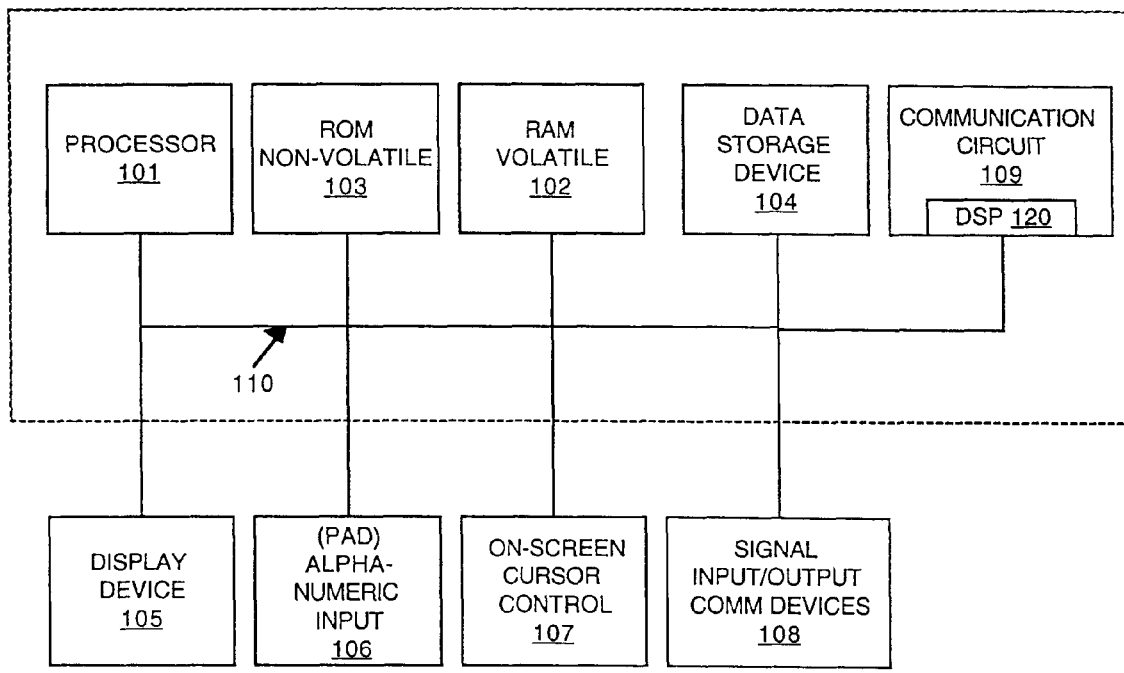
FIG. 5 is a block diagram of one embodiment of a portable computer system in accordance with the present invention.

FIG. 5 illustrates circuitry of computer system 100, some of which can be implemented on PC board 225 (FIG. 4). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

With reference still to FIG. 5, computer system 100 also includes a signal transmitter/receiver device 108, which is coupled to bus 110 for providing a physical communication link between computer system 100, and a network environment (e.g., network environments 50 and 51 of FIGS. 1A and 1B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 5 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 6:
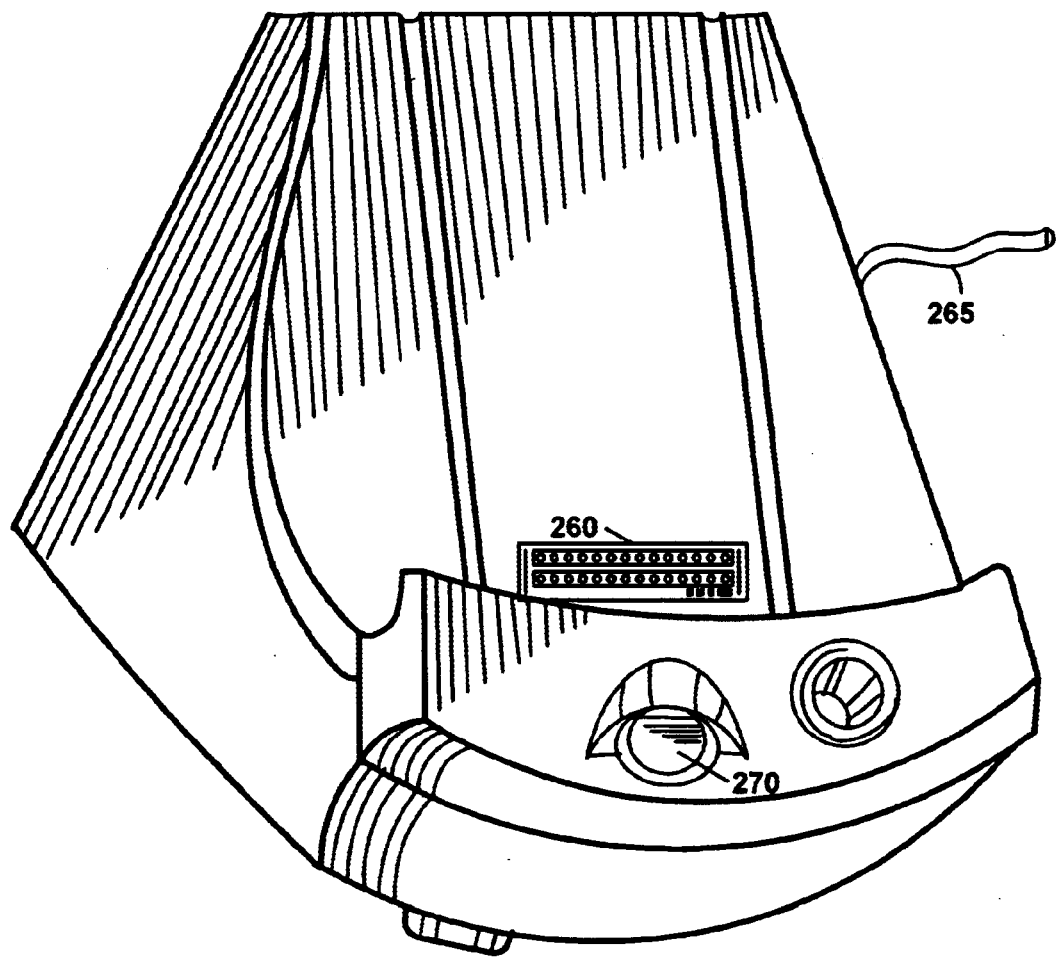
FIG. 6 is a perspective view of the cradle device for connecting the portable computer system to other systems via a communication interface in accordance with one embodiment of the present invention.

FIG. 6 is a perspective illustration of one embodiment of the cradle 60 for receiving the palmtop computer system 100. Cradle 60 contains a mechanical and electrical interface 260 for interfacing with communication interface 108 (FIG. 3) of computer system 100 when system 100 is slid into the cradle 60 in an upright position. Once inserted, button 270 can be pressed to initiate two-way communication (e.g., a communication session) between computer system 100 and other computer systems coupled to serial communication 265.

Exemplary Desktop/Laptop Platform

Figure 7:
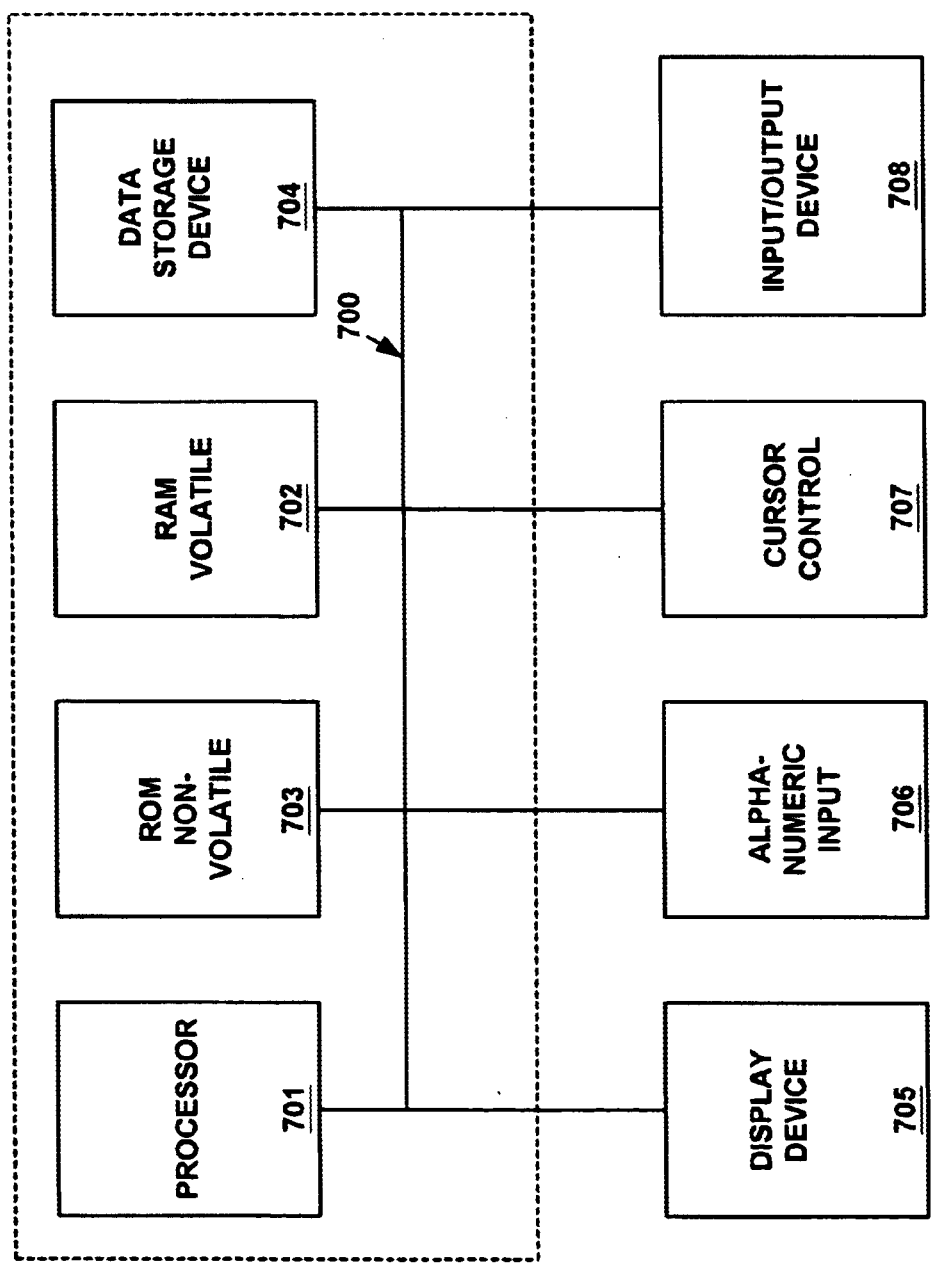
FIG. 7 is a block diagram of one embodiment of a desktop or laptop computer system in accordance with the present invention.

Refer now to FIG. 7 which illustrates an exemplary host computer system 342 (e.g., desktop computer system 56 or laptop computer system 58 of FIG. 1B) upon which embodiments of the present invention may be practiced. In one embodiment, host computer system 342 may instead be a server computer system in a computer system network (including the World Wide Web) or a proxy server computer (e.g., proxy server 36 of FIG. 1B).

Continuing with reference to FIG. 7, in general, computer system 342 comprises bus 700 for communicating information, processor 701 coupled with bus 700 for processing information and instructions, random access (volatile) memory (RAM) 702 coupled with bus 700 for storing information and instructions for processor 701, read-only (non-volatile) memory (ROM) 703 coupled with bus 700 for storing static information and instructions for processor 701, data storage device 704 such as a magnetic or optical disk and disk drive coupled with bus 700 for storing information and instructions, an optional user output device such as display device 705 coupled to bus 700 for displaying information to the computer user, an optional user input device such as alphanumeric input device 706 including alphanumeric and function keys coupled to bus 700 for communicating information and command selections to processor 701, and an optional user input device such as cursor control device 707 coupled to bus 100 for communicating user input information and command selections to processor 701. Furthermore, an optional input/output (I/O) device 708 is used to couple computer system 342 to, for example, a communication bus (e.g., communication bus 54 of FIG. 1B).

Continuing with reference to FIG. 7, display device 705 utilized with computer system 342 may be a liquid crystal device, cathode ray tube, or other display device suitable for creating graphic images and alphanumeric characters recognizable to the user. Cursor control device 707 allows the computer user to dynamically signal the two-dimensional movement of a visible symbol (pointer) on a display screen of display device 705. Many implementations of the cursor control device are known in the art including a trackball, mouse, joystick or special keys on alphanumeric input device 706 capable of signaling movement of a given direction or manner of displacement. It is to be appreciated that the cursor control 707 also may be directed and/or activated via input from the keyboard using special keys and key sequence commands. Alternatively, the cursor may be directed and/or activated via input from a number of specially adapted cursor directing devices.

Figure 8:
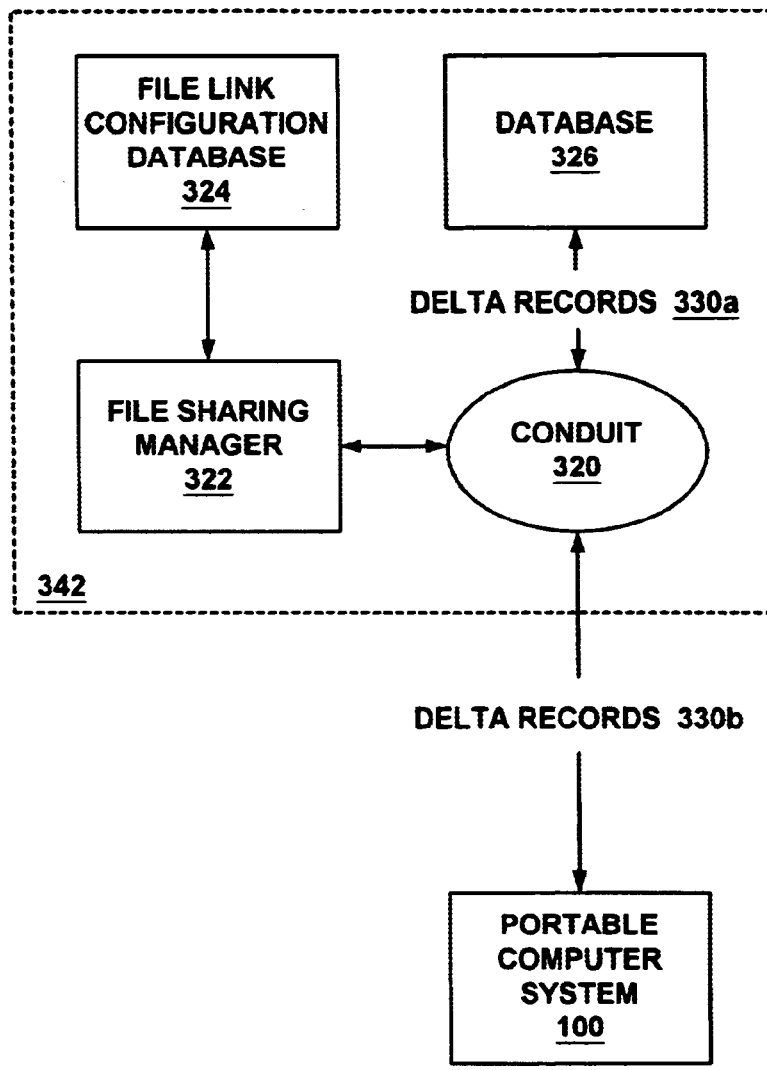
FIG. 8 is a block diagram of a one embodiment of a system for allowing a portable computer system and another computer system to transfer an application in accordance with the present invention.

FIG. 8 illustrates a system 340 (also referred to as an "installer") in accordance with one embodiment of the present invention for allowing a portable computer system 100 (e.g., a palmtop or any portable computer system) to share information with a host computer system 342 (FIG. 7). Computer system 342 contains database 326, a software file sharing manager 322 (e.g., a hot-sync software manager), a file link configuration database 324, and a software conduit 320. The file link configuration database 324 is linked to the file sharing manager 322 and specifies, for a particular database, its source file, category information, and the frequency of update for the database. Conduit 320 outlines the manner in which records are to be synchronized between databases under control of file sharing manager 322. This process, including the file sharing manager and the conduit, is described in U.S. Pat. No. 5,884,323 by Hawkins et al., issued Mar. 16, 1999, assigned to the assignee of the present invention and hereby incorporated by reference.

With reference still to FIG. 8, portable computer system 100 is interfaced with computer system 342 using cradle 60 (FIG. 1B). Alternatively, portable computer system 100 can be interfaced with computer system 342 using a wireless (e.g., radio) connection. During synchronization between portable computer system 100 and database 326, delta records 330a and 330b are passed through conduit 320 between database 326 and a database of portable computer system 100 under control of the file sharing manager 322. Delta records 330a and 330b represent changes (including additions) that occurred on either portable computer system 100 or on computer system 342. After synchronization, these two databases will contain the same information. Namely, records updated on portable computer system 100 are reflected in database 326 and vice versa. The synchronization process (including the file sharing[]manager) is described in U.S. Pat. No. 6,006,274 by Hawkins et al., issued Dec. 21, 1999, assigned to the assignee of the present invention and hereby incorporated by reference. Synchronization is also described in U.S. Pat. No. 5,727,202 by Kucala, issued Mar. 10, 1998, assigned to the assignee of the present invention and hereby incorporated by reference, and also in U.S. Pat. No. 5,832,489 by Kucala, issued Nov. 3, 1998, assigned to the assignee of the present invention and hereby incorporated by reference.

Figure 9A:
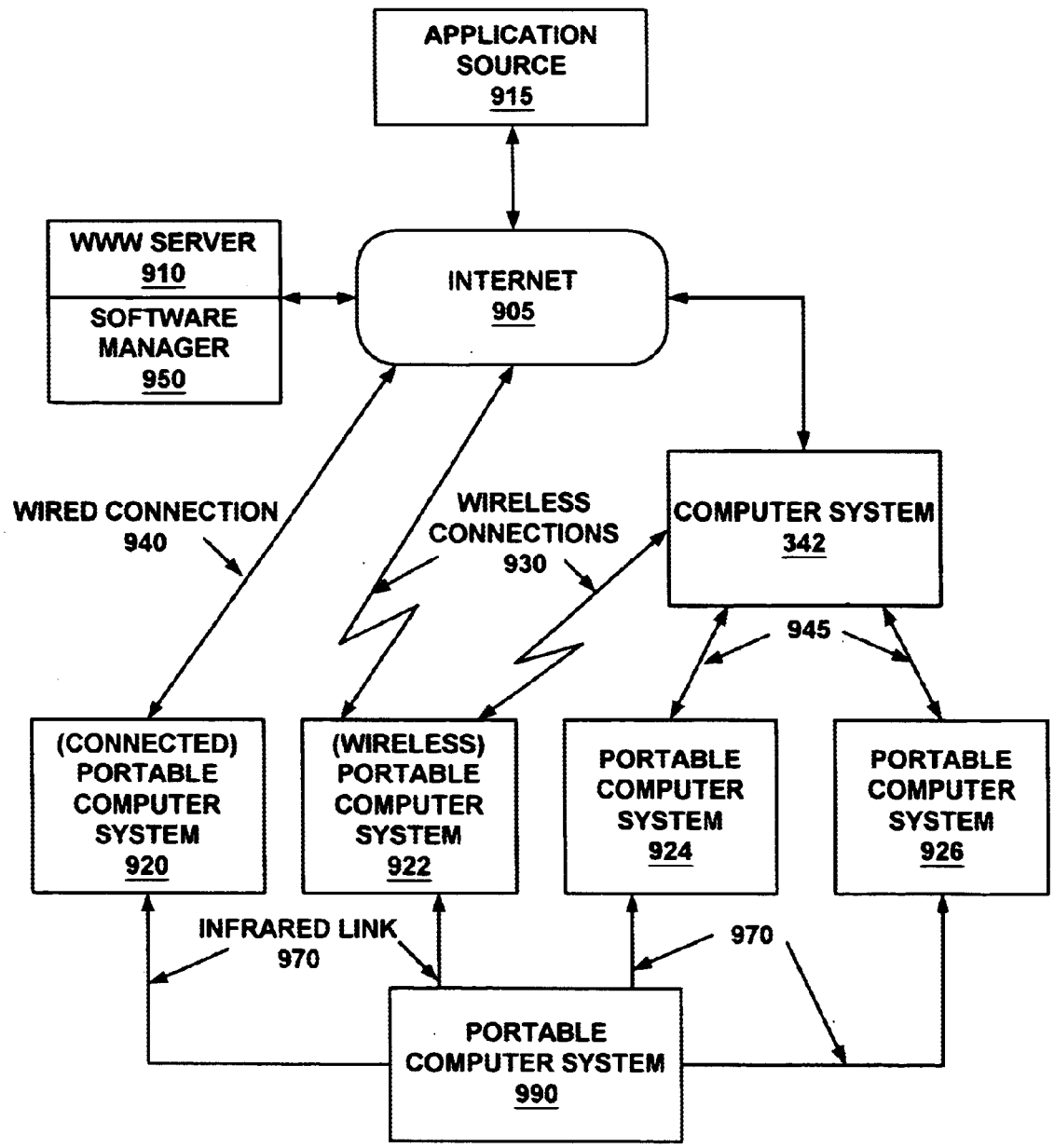
FIG. 9A is a block diagram showing one embodiment of a system for installing an application on a portable computer system in accordance with the present invention.

On-line Modular Configuration and Distribution of Applications Customized for a Requestor Device FIG. 9A is a block diagram showing one embodiment of a system 900 for installing an application onto a portable computer system in accordance with the present invention. It is appreciated that the application may be based on the Component Object Model (COM) software architecture or one of the other well-known architectures such as Common Object Request Broker Architecture (CORBA), Distributed COM (DCOM), and Distributed Computing Environment (DCE).

In system 900, the application to be installed (or the associated components, objects or files) is located at application source 915 (e.g., a site on the World Wide Web) that is accessed through the Internet 905. Also coupled to the Internet 905 is a World Wide Web (WWW) server 910. It is appreciated that application source 915 may instead be located on WWW server 910. In another embodiment, the application source 915 is a site on an Intranet. Alternatively, application source 915 may be a local source residing, for example, on computer system 342, such as data storage device 704 (FIG. 7).

In accordance with the present embodiment of the present invention, a portable computer system can be communicatively coupled to the Internet 905 using any of a variety of methods. In one implementation, portable computer systems 924 and 926 can be coupled via a communication link 945 to a computer system 342, which in turn is coupled to the Internet 905. Communication link 945 may be a wired connection, such as that described in conjunction with FIG. 1B. Alternatively, communication link 945 may be a wireless connection.

Continuing with reference to FIG. 9A, in another implementation, portable computer system 922 can be coupled to either or both Internet 905 and computer system 342 via a wireless connection 930, such as that described in conjunction with FIG. 1A. In still another implementation, portable computer system 920 can be connected via a wired connection 940 to the Internet 905.

In accordance with the present invention, portable computer systems 920, 922, 924 and 926 can each implement different types of hardware and software. That is, portable computer systems 920, 922, 924 and 926 may each use, for example, different processors, display devices, and operating systems. Types of processors used in portable computer systems include the Advanced RISC (reduced instruction set computer) microprocessor, the Hitachi HC11 processor, the Transmeta Clipper Chip, Intel Mobile chip sets, and 68000-based chip sets. The types of display devices include monochrome and color displays. Operating systems may be differently configured for individual portable computer systems depending on the applications implemented on the portable computer system; additional information is provided in the copending patent application entitled "Sync-Time Read Only Memory Image Binding for Limited Resource Devices," by G. Mcilroy, Ser. No. 09/572,563 with filing date May 16, 2000, assigned to the assignee of the present invention and hereby incorporated by reference.

With reference to FIG. 9A, portable computer system 990 can be linked to each of portable computer systems 920, 922, 924 and 926 using an infrared wireless link 970 (e.g., using communication mechanism 64 of FIG. 1B). Portable computer system 990 can utilize different hardware and/or software than portable computer systems 920, 922, 924 and 926, as described above.

In accordance with the present embodiment of the present invention, a shell describing an application of interest is beamed from portable computer system 990 to portable computer systems 920, 922, 924 and 926. The application description is beamed from one portable computer system to the other instead of the application itself. The application description beamed from portable computer system 990 contains information sufficient for identifying and locating the application of interest, either locally or on the WWW. For example, the application description can contain a Uniform Resource Locator (URL) providing the address on the WWW at which the application can be found (e.g., a URL identifying application source 915 or a location within application source 915). The application description can also contain information identifying the version of the application of interest, the name of the application, the vendor's name, or other such identifying information.

In the present embodiment of the present invention, WWW server 910 executes a software manager 950, also known as a "resolver." In accordance with the present invention, a portable computer system (e.g., portable computer systems 920, 922, 924 and 926) communicates the application description provided by portable computer system 990 to software manager 950. In one embodiment, portable computer systems 920, 922, 924 and 926 can also communicate their hardware and software attributes to software manager 950.

Figure 9B:
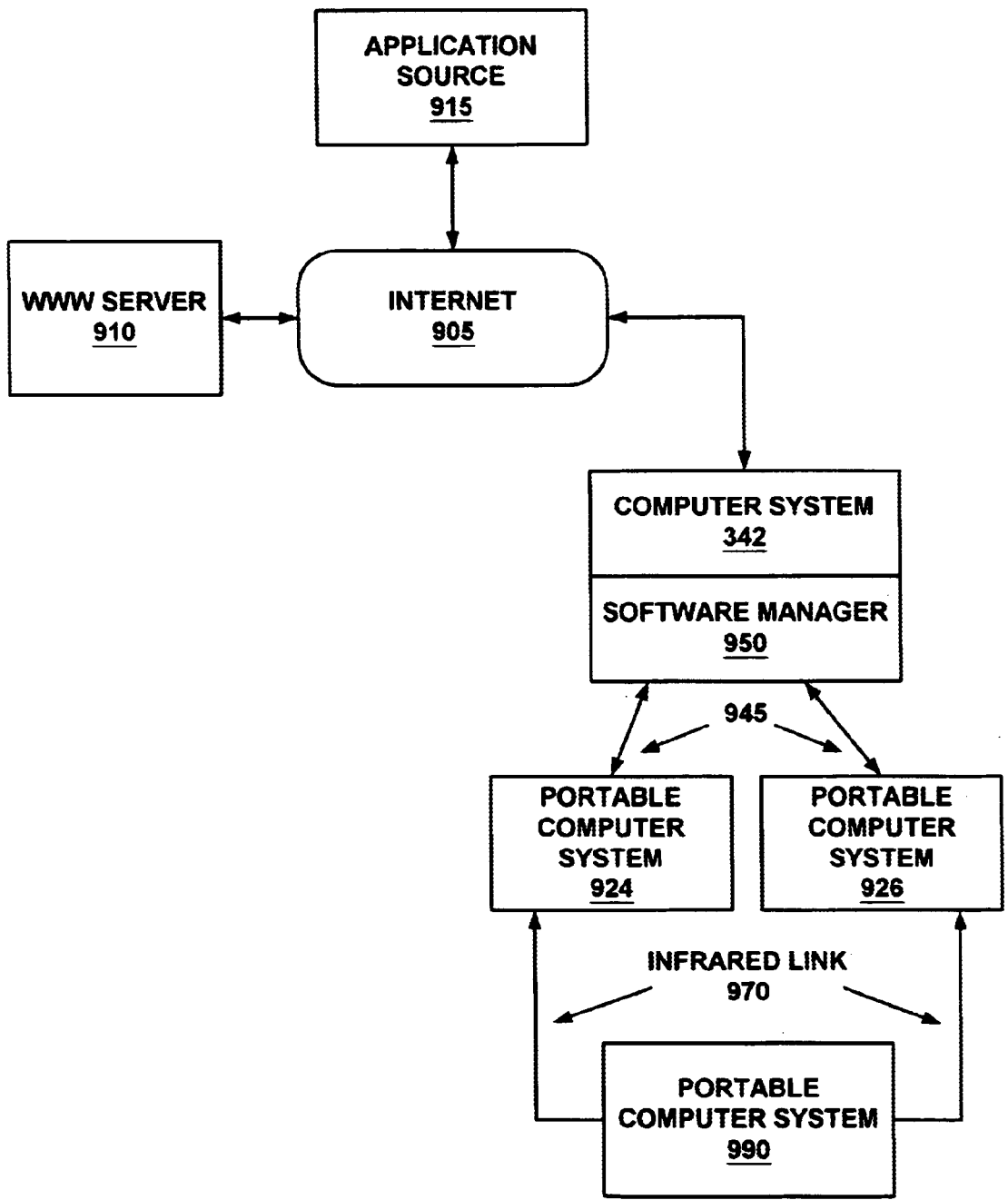
FIG. 9B is a block diagram showing another embodiment of a system for installing an application on a portable computer system in accordance with the present invention.

FIG. 9B is a block diagram showing another embodiment of system 900 for installing an application on a portable computer system in accordance with the present invention. In this embodiment, software manager 950 resides on computer system 342.

Portable computer systems 924 and 926 are communicatively coupled to computer system 342 via a communication link 945 (either wired or wireless). In accordance with the present invention, portable computer systems 924 and 926 can each implement different types of hardware and software. Portable computer system 990 can be linked to each of portable computer systems 924 and 926 using an infrared wireless link 970 (e.g., using communication mechanism 64 of FIG. 1B). Portable computer system 990 may use different hardware and/or software than portable computer systems 924 and 926.

In accordance with the present embodiment of the present invention, in a manner similar to that described above in conjunction with FIG. 9A, a shell or description for the application of interest is beamed from portable computer system 990 to portable computer systems 924 and 926. In turn, portable computer systems 924 and 926 can communicate the application description to software manager 950. In one embodiment, portable computer systems 924 and 926 can also communicate information identifying their hardware and software attributes to software manager 950.

With reference to FIGS. 9A and 9B, in accordance with the present invention, software manager 950 uses the application description and the hardware and software information to automatically locate a version of the application of interest compatible with the particular portable computer system. Software manager 950 can also retrieve the "software elements" associated with the application (e.g., the application itself, or the files, components or objects for the application). In addition, software manager 950 can locate and retrieve other resources needed to support use of the application of interest on the particular portable computer system. Furthermore, software manager 950 can make the application (and/or the associated files, components or objects) ready for installation on the portable computer system. Additional information is provided below.

Thus, in accordance with the present embodiment of the present invention, the version of the software elements (e.g., the application itself or files, components or objects for the application) that is compatible With the hardware and software attributes of portable computer systems 920, 922, 924 or 926 is retrieved from application source 915 based on the application description received from portable computer system 990. Therefore, it is not necessary that portable computer system 990 and portable computer systems 920, 922, 924 and 926 have the same hardware and software attributes.

Furthermore, a user does not have to know the particulars of the application to be installed or of the hardware and software used by his/her palmtop. The user also does not need to intervene in the process for locating and retrieving the application to be installed, and for making the application ready for installation. The present invention therefore simplifies for users the process of finding an application, selecting the proper version, and downloading the application onto the palmtop.

Continuing with reference to FIGS. 9A and 9B, in accordance with one embodiment of the present invention, software manager 950 parses the information describing the application of interest (e.g., the application description or shell). Software manager 950 can retrieve the components, objects, files or the application itself. In one embodiment, software manager 950 also uses the hardware and software information for portable computer systems 920, 922, 924 and 926 to narrow the search and retrieve the compatible version of the components, objects, files or application.

In one embodiment, software manager 950 can be used to automatically make the software elements for the application (e.g., the application itself, or the components, objects or files for the application) ready for installation on the portable computer system. In one embodiment, software manager 950 resolves library dependencies between the components, objects, or files to be installed so that the application can be built and installed.

In one embodiment, software manager 950 can automatically identify and retrieve additional resources needed to support the installation and functionality of the application of interest on the portable computer system. For example, the operating systems of portable computer systems 920, 922, 924 and 926 may be individually tailored to support only the applications currently installed. Additional information is provided in the copending patent application entitled "Sync-Time Read Only Memory Image Binding for Limited Resource Devices," by G. Mcilroy, Ser. No. 09/572, 563, with filing date May 16, 2000, assigned to the assignee of the present invention and hereby incorporated by reference. Software manager 950 can be used to locate those software elements (e.g., files, components or objects) that are needed by the operating system to support the new application.

In addition, if the application is in a compressed format, software manager 950 can automatically decompress it. Software manager 950 can also automatically identify that the application (or the components, objects or files needed for the application) is ready for installation. For example, software manager 950 can tag the application (or the components, objects or files needed for the application) such that, during a subsequent synchronization of the portable computer system and host computer system 342, the application is automatically installed on the portable computer system.

It is appreciated that, in other embodiments, some or all of the functions performed by software manager 950 may be incorporated into the installer (e.g., system 340 of FIG. 8). For example, the application may instead be made ready for installation (e.g., decompressed) and identified as ready for installation on the portable computer system using system 340.

In the case in which the portable computer systems are coupled with the Internet 905 (e.g., portable computer systems 920 and 922 of FIG. 9A), the application (or the appropriate files, components or objects) can be installed on the portable computer systems 920 and 922 whenever the portables are in communication with the Internet. In the case in which the portable computer systems (e.g., portable computer systems 924 and 926 of FIG. 9B) are instead linked to the Internet 905 by a host computer system (e.g., computer system 342 of FIG. 9B), then the application (or the appropriate files, components or objects) can be installed at the next sync time using system 340 of FIG. 8.

Continuing with reference to FIGS. 9A and 9B, in one embodiment, software manager 950 can automatically identify when a different version (e.g., a more recent version) of an application, relative to the version described by the application shell, is available from application source 915. Similarly, when the application is comprised of multiple components, files or objects, software manager 950 can automatically identify when a later version of a component, file or object is available. In one embodiment, software manager 950 can automatically install the latest version of the application, component, file or object. In an alternative embodiment, the user can indicate which version should be installed.

In one embodiment, software manager 950 can also be used to automatically receive billing and payment information for the application, or to automatically receive terms and conditions for use of the application. That is, when the application, component, file or object is retrieved from application source 915, any applicable billing and payment information or terms and conditions associated with the application, etc., can also be retrieved at the same time and provided to the user.

In summary, the present embodiment of the present invention provides a user-friendly method of transferring an application from one portable computer system to another. An application description is beamed from one portable computer system to another. The application description provides information sufficient for allowing a software manager (e.g., a resolver) to automatically locate and retrieve the application of interest from an application source. The process of locating and retrieving an application and making the application ready for installation can be performed automatically by the software manager without user intervention, thereby simplifying for users the process of finding an application, selecting the proper version, and downloading the application onto the portable computer system.

Because software manager 950 uses the application description to retrieve the version of the application compatible with the hardware and software of the portable computer system on which the application is to be installed, applications can be shared between different types of portable computer systems having different hardware and software attributes. This provides an advantage as portable computer systems evolve and different models become more prevalent. For example, users in the same household may each have a different model of portable computer system with different hardware and software attributes. Software manager 950 provides the services to resolve the differences. Accordingly, different portable computer systems (e.g., portable computer systems 924 and 926 of FIG. 9B) can be coupled to the same host computer system (e.g., computer system 342) for synchronization, and software manager 950 can recognize and handle the differences.

For example, a first user may synchronize a portable computer system with a 68000-based chip set, and a second user may synchronize a portable computer system with an ARM processor. Software manager 950 will automatically locate and install 68000-based applications on the first portable and ARM-based applications on the second portable.

Figure 10A:
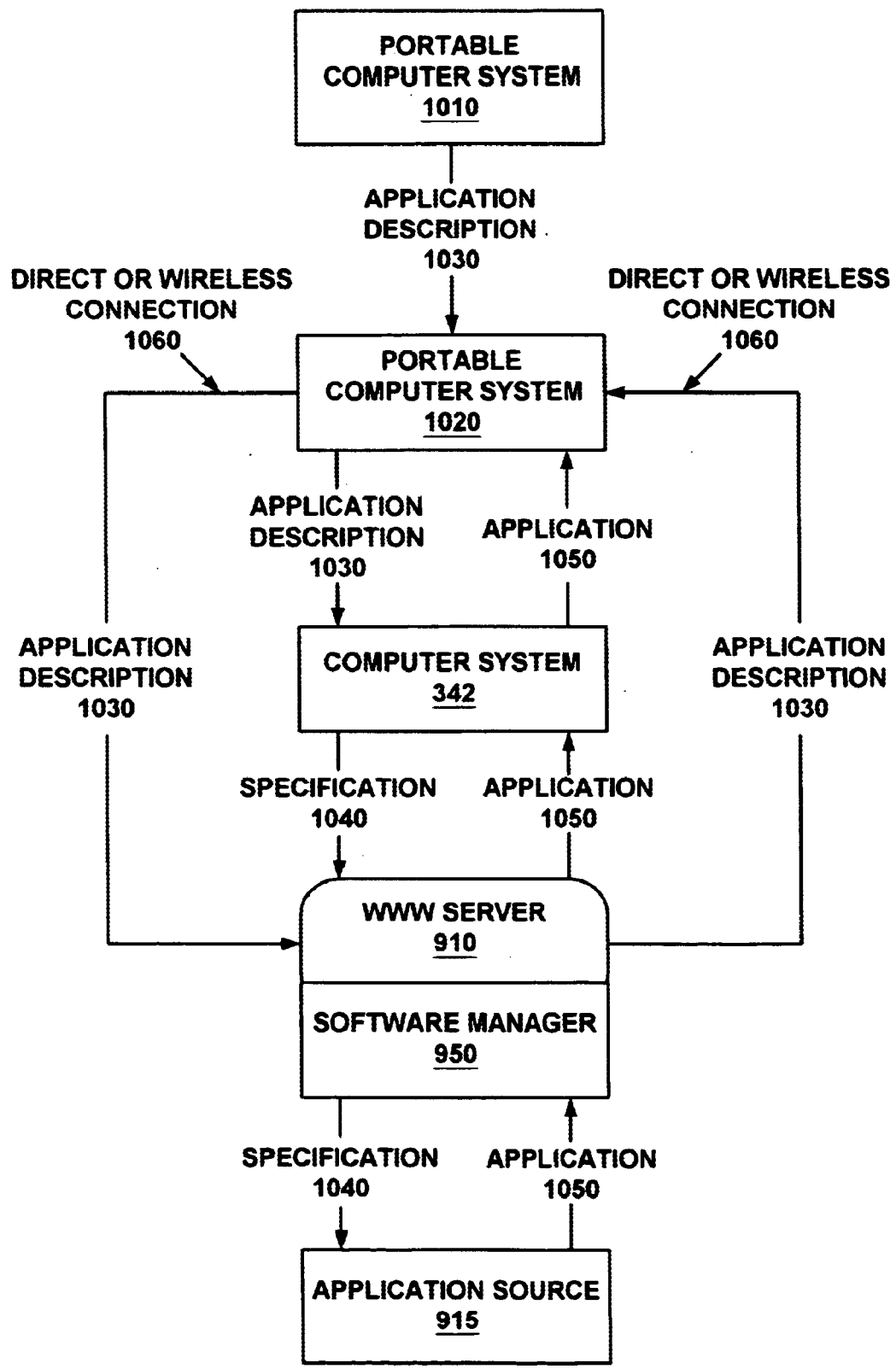
FIG. 10A is a data flow diagram for locating and installing an application on a portable computer system in accordance with one embodiment of the present invention.

FIG. 10A is a data flow diagram associated with locating an application 1050 and installing it on a portable computer system 1020 in accordance with one embodiment of the present invention. In this embodiment, software manager 950 resides on WWW server 910 (FIG. 9A).

With reference still to FIG. 1A, a version of application 1050 is present on portable computer system 1010. In the present embodiment, an application description 1030 is beamed from portable computer system 1010 to portable computer system 1020. Application description 1030 contains sufficient information for locating application 1050 at a source (e.g., application source 915 of FIGS. 9A and 9B). For example, application description 1030 may contain a URL, a version number, or the like.

Continuing with reference to FIG. 10A, in the case in which portable computer system is coupled to the Internet 905 via a host computer system 342, application description 1030 is forwarded to computer system 342 via communication link 945 (see FIG. 9A), typically at sync time. In the present embodiment, computer system 342 also receives information identifying the particular hardware and software attributes of portable computer system 1020 (e.g., the type of processor, display, or operating system, or the amount of available memory). The application description 1030 and the hardware and software attributes are forwarded to the Internet 905 (FIG. 9A) by computer system 342 in specification 1040; that is, specification 1040 comprises application description 1030 and the identified hardware and software attributes of portable computer system 1020.

With reference still to FIG. 10A, in the case in which portable computer system 1020 is coupled to the Internet 905, application description 1030 is provided to the Internet 905 (e.g., WWW server 910) via wireless connection 930 or wired connection 940 (see FIG. 9A). In the present embodiment, WWW server 910 also receives information identifying the hardware and software attributes of portable computer 1020 and includes these attributes with application description 1030 in specification 1040.

Continuing with reference to FIG. 10A, software manager 950 uses the information in specification 1040 to locate the proper version of application 1050 at application source 915. For example, software manager 950 can use the URL provided by specification 1040 to find application 1050. Information in specification 1040 can be used to identify a version of application 1050 compatible with the hardware and software used by portable computer system 1020.

Software manager 950 receives application 1050 (or the files, components or objects needed for application 1050) from application source 915. In one embodiment, software manager 950 can automatically identify and retrieve additional resources needed to support the installation and use of the application 1050 on portable computer system 1020. For example, software manager 950 can be used to locate any new or additional software elements (e.g., files, components or objects) that are needed by the operating system to support application 1050.

In the case in which portable computer system 1020 is coupled to the Internet 905 via wireless connection 930 or wired connection 940 (FIG. 9A), software manager 950 forwards application 1050 (and/or appropriate files, components or objects) to portable computer system 1020 accordingly. In the case in which portable computer system 1020 is coupled to the Internet 905 via a host computer system 342, software manager 950 forwards application 1050 (and/or the appropriate files, components or objects) to portable computer system 1020 via computer system 342. When computer system 342 and portable computer system 1020 are next synchronized (FIG. 8), application 1050 (and/or the appropriate files, components or objects) can be installed on portable computer system 1020.

Figure 10B:
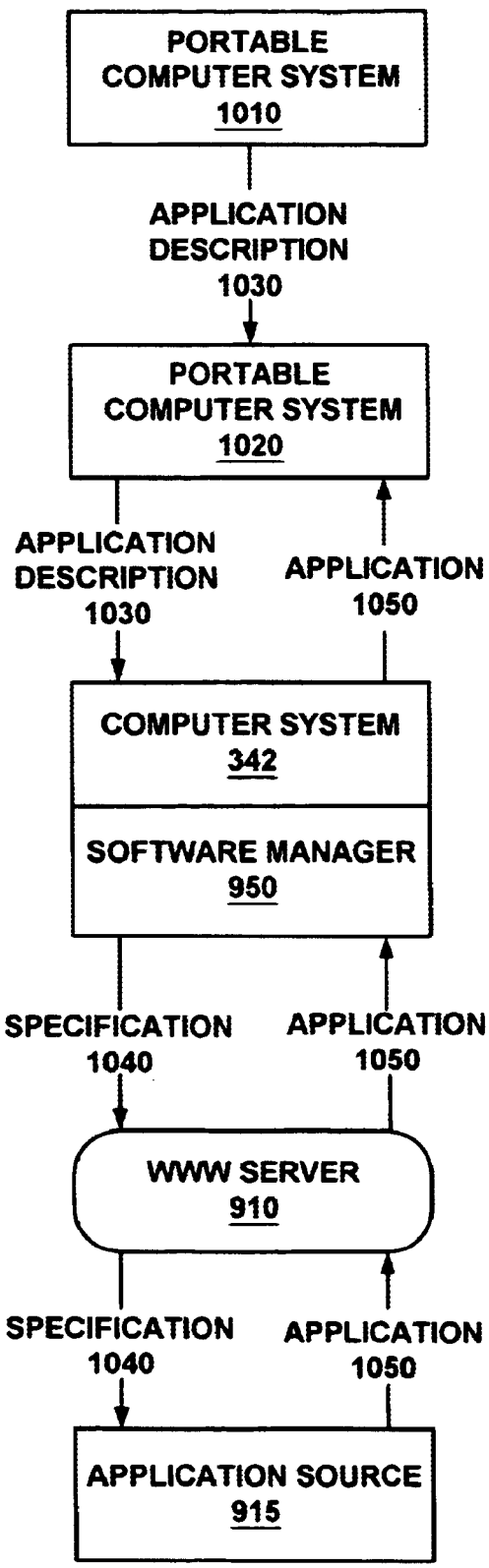
FIG. 10B is a data flow diagram for locating and installing an application on a portable computer system in accordance with another embodiment of the present invention.

FIG. 10B is a data flow diagram associated with installing an application 1050 on a portable computer system 1020 in accordance with another embodiment of the present invention. In this embodiment, software manager 950 resides on computer system 342 (FIG. 9B).

With reference still to FIG. 10B, a version of application 1050 is present on portable computer system 1010. In the present embodiment, an application description 1030 is beamed from portable computer system 1010 to portable computer system 1020. Application description 1030 contains sufficient information for locating application 1050 at a source (e.g., application source 915 of FIGS. 9A and 9B). For example, application description 1030 may contain a URL, a version number, or the like.

Continuing with reference to FIG. 10B, application description 1030 is forwarded to computer system 342, specifically to software manager 950, via communication link 945 (see FIG. 9A), typically at sync time. In the present embodiment, computer system 342 (specifically, software manager 950) also receives information identifying the particular hardware and software attributes of portable computer system 1020 (e.g., the type of processor, display, or operating system). In this embodiment, specification 1040 comprises application description 1030 and the identified hardware and software attributes of portable computer system 1020.

Continuing with reference to FIG. 10B, with computer system 342 coupled to the Internet 905 (specifically, WWW server 910), software manager 950 uses the information in specification 1040 to locate application 1050 at application source 915. For example, software manager 950 can use the URL provided by specification 1040 to find application 1050. Information in specification 1040 can be used to identify a version of application 1050 compatible with the hardware and software attributes of portable computer system 1020.

Software manager 950 receives application 1050 (or the appropriate files, components or objects) from application source 915 via the Internet 905. In one embodiment, software manager 950 can automatically identify and retrieve additional resources needed to support the installation and use of the application 1050 on portable computer system 1020. For example, software manager 950 can be used to locate those software elements (e.g., files, components or objects) that are needed by the operating system to support a new application. When computer system 342 and portable computer system 1020 are next synchronized (FIG. 8), application 1050 (and/or the appropriate files, components or objects) can be installed on portable computer system 1020.

Figure 11:
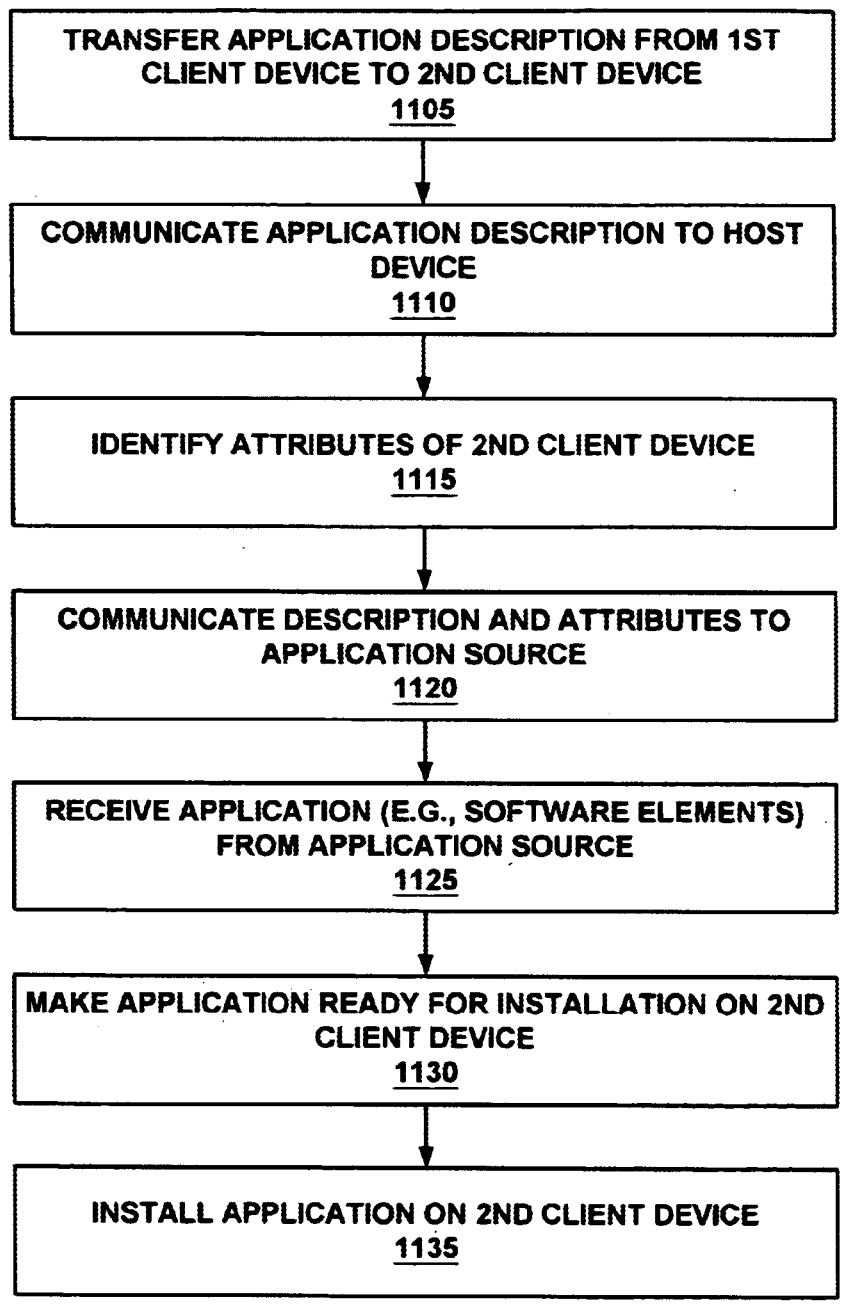
FIG. 11 is a flowchart of the steps in a process for locating and installing an application on a portable computer system in accordance with one embodiment of the present invention.

FIG. 11 is a flowchart of the steps in a process 1100 for locating and installing an application 1050 (FIGS. 10A and 10B) on a portable computer system 1020 (FIGS. 10A and 10B) in accordance with one embodiment of the present invention. Process 1100 is implemented by software manager 950 (FIGS. 9A and 9B) installed on either WWW server 910 (FIG. 9A) or host computer system 342 (FIG. 9B). It is appreciated that some or all of the resolver functions of software manager 950 and the installer functions of system 340 (FIG. 8) may be integrated into a single module. In accordance with the present embodiment of the present invention, process 1100 is executed automatically, substantially without user intervention, and thus provides a user-friendly process for installing an application onto a portable computer system.

With reference to FIG. 11 as well as to FIGS. 10A and 10B, in step 1105, the application description 1030 for application 1050 is beamed from portable computer system 1010 to portable computer system 1020. Application description 1030 contains information sufficient for software manager 950 to identify and locate application 1050.

In step 1110, application description 1030 is communicated by portable computer system 1020 to the host device on which software manager 950 resides. In one embodiment, in which software manager 950 resides on computer system 342, application description 1030 is communicated to computer system 342. In another embodiment, in which software manager 950 resides on WWW server 910, application description 1030 is communicated to WWW server 910. In this latter embodiment, application description 1030 can be communicated by portable computer system 1020 directly to WWW server 910 via a wireless connection 930 or a wired connection 940 (see FIG. 9A), or application 1030 can be communicated by portable computer system 1020 to WWW server 910 via computer system 342 (see FIG. 9B).

Continuing with reference to FIGS. 10A, 10B and 11, in step 1115, software manager 950 receives information identifying the particular hardware and software attributes of portable computer system 1020 (e.g., the type of processor, the type of display, or the amount of memory, as well as information about the operating system).

In step 1120, application description 1030 and the hardware and software attributes of portable computer system 1020 are communicated to application source 915 by software manager 950. That is, a specification 1040 comprising application description 1030 and the hardware and software information is used by software manager 950 to locate application source 915, or to locate application 1050 within application source 915. Application 1050 may be stored locally or on the WWW. Accordingly, application source 915 may be located on WWW server 910, it may be located at a different Web site accessible via the Internet 905, or it may reside on computer system 342, such as data storage device 704 (FIG. 7). For example, applications may be downloaded and stored in memory of computer system 342, and then subsequently accessed by a portable computer system.

Software manager 950 selects the version of application 1050 based on the information in specification 1040. In one embodiment, software manager 950 identifies when a different version (e.g., a more recent version) of application 1050 (or of the files, components or objects associated with application 1050) is available. In one embodiment, software manager 950 automatically selects the more recent version. In another embodiment, the more recent version is selected in response to user input.

In step 1125, software manager 950 receives application 1050 (or the associated files, components or objects) from application source 915. In one embodiment, software manager 950 also receives billing and payment information associated with application 1050.

In step 1130, software manager 950 makes application 1050 (or the associated files, components or objects) ready for installation on portable computer system 1020. In one embodiment, software manager 950 can automatically identify and retrieve additional resources needed to support the installation and use of the application 1050 on portable computer system 1020. For example, software manager 950 can be used to locate those software elements (e.g., files, components or objects) that are needed by the operating system to support application 1050.

In addition, if application 1050 is in a compressed format, then the file can be decompressed. Library dependencies can be resolved. Files, components or objects can be compiled to form application 1050. Application 1050, when ready for installation on portable computer system 1020, can be identified as ready for installation. For example, application 1050 can be tagged so that it can be readily found by the installer (e.g., system 340 of FIG. 8).

In step 1135, with reference still to FIGS. 10A, 10B and 11, application 1050 (or the associated files, components or objects) is installed on portable computer system 1020. In the present embodiment, the installation is performed by system 340 (FIG. 8) at sync time.

In summary, the present embodiment of the present invention provides a user-friendly system and method of transferring an application from one palmtop to another, in particular for those cases in which the application as configured for one palmtop is not compatible with the hardware or software used by the other palmtop (because, for example, the hardware or the operating systems are not compatible between the palmtops). The present invention also provides a system and method that can provide a user-friendly mechanism for locating the proper version of the application and for installing the application onto a palmtop when, for example, the application is retrieved from a source and then installed on the palmtop using a host computer system.

In accordance with the present embodiment of the present invention, the process of identifying and retrieving the appropriate version of an application and making the application ready for installation can be performed automatically, substantially without user intervention. The user does not have to know the particulars of the application to be installed or of the hardware and software used by his/her palmtop. The user also does not need to intervene in order to prepare the application for installation. The present invention therefore simplifies for users the process of finding an application, selecting the proper version, and downloading the application onto the palmtop.

In addition, the present embodiment of the present invention provides a system and method that can, when so desired, provide a mechanism for providing billing information associated with installing the application onto a palmtop.

Automatic Selection and Updating of Software Application Version

Figure 12:
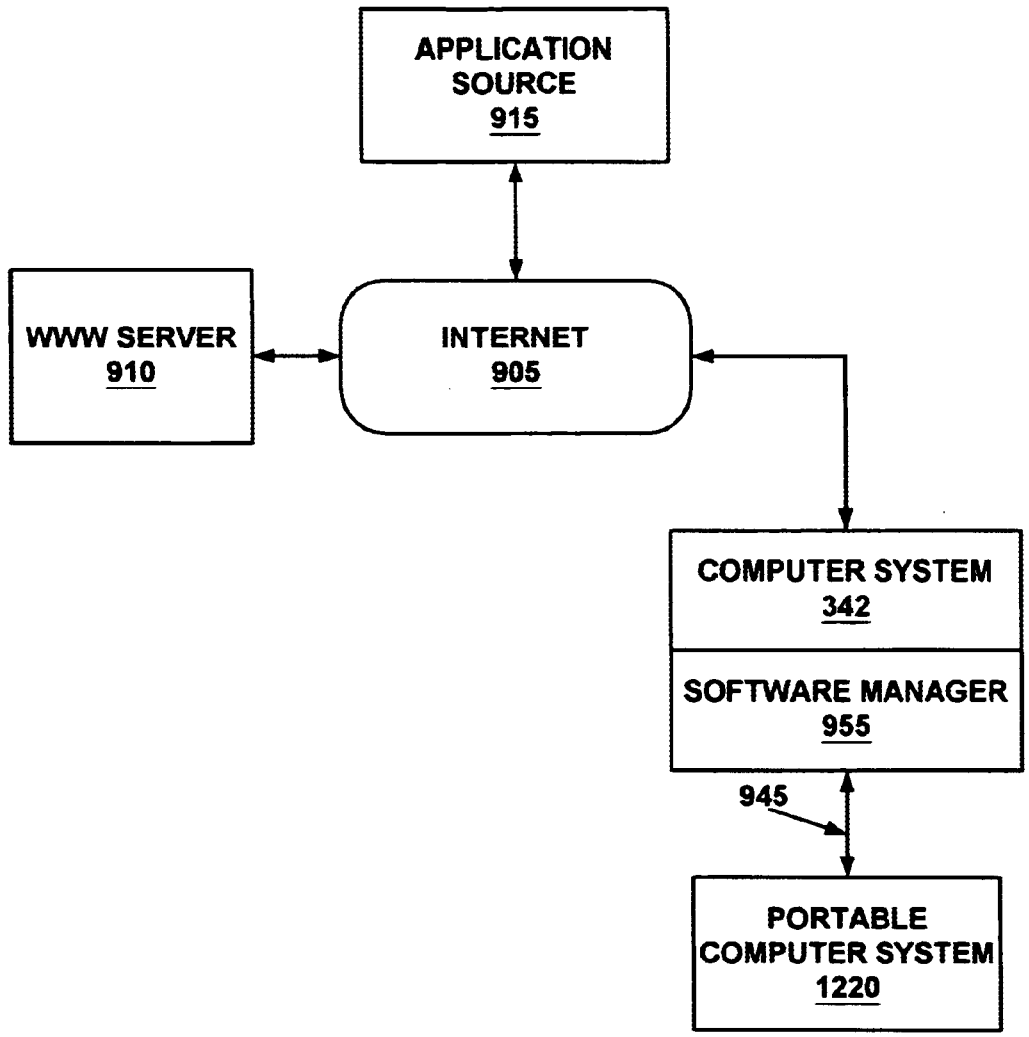
FIG. 12 is a block diagram showing one embodiment of a system for updating an application on a portable computer system in accordance with the present invention.

FIG. 12 is a block diagram showing one embodiment of a system 1200 for updating an application on a portable computer system 1220 in accordance with the present invention. In the present embodiment, applications are located at application source 915 (e.g., a site on the WWW), which is accessed through the Internet 905. Also coupled to the Internet 905 is a WWW server 910. It is appreciated that application source 915 may instead by located on WWW server 910 or on an Intranet. Alternatively, application source may be a local source located, for example, on computer system 342, such as data storage device 704 (FIG. 7).

In the present embodiment, portable computer system 1220 is communicatively coupled to a host computer system 342 via communication link 945, which may be a wired link or a wireless link. Computer system 342 in turn is communicatively coupled to the Internet 905.

In the present embodiment of the present invention, a software manager 955 resides on computer system 342. It is appreciated that software manager 955 may be separate from software manager 950 described above (see FIGS. 9A and 9B), or that some or all of the functions of software manager 955 and software manager 950 may be integrated into a single module. Furthermore, it is appreciated that some or all of the functions of software manager 955 may be integrated with the installer functions of system 340 (FIG. 8).

With reference still to FIG. 12, when portable computer system 1220 and computer system 342 are synchronized (see FIG. 8), the software currently installed on portable computer system 1220 is communicated to software manager 955. In one embodiment, the hardware and software attributes (e.g., type of processor, type of display device, type of operating system, and amount of memory available) can also be communicated to software manager 955.

Subsequently, when computer system 342 is in communication with the Internet 905, software manager 955 can be used for automatically determining if a newer version of each application currently installed on portable computer system 1220, and compatible with the hardware and software attributes of portable computer system 1220, is available from application source 915. For COM-based applications, or applications based on other well-known architectures, software manager 955 can automatically determine whether newer versions of the components, objects or files associated with each application are available.

In the present embodiment, the search process can be performed by software manager 955 during each synchronization of portable computer system 1220 and computer system 342. In accordance with the present invention, the search can be performed automatically and thus provides a systematic mechanism for identifying whether an update is available. Accordingly, it is not necessary for a user to regularly search for updates, eliminating the guesswork on the part of the user as to when an update may be available. In addition, it is not necessary for a user to have to recall the source of each of the applications installed on his/her portable computer system. Furthermore, it is not necessary for the user to have knowledge of the particular hardware and software used by his/her portable computer system.

In accordance with the present embodiment of the present invention, once the availability of an updated version of an application, file, component or object is determined, the updated version can be retrieved, made ready for installation, and installed on portable computer system 1220 as described above in conjunction with FIGS. 10A, 10B and 11. It is understood that the process of retrieving and installing the application, file, component or object can be performed automatically by software manager 955 with little or no user intervention. However, in one embodiment, the update is performed in response to user input; that is, the user indicates whether the update should be performed or whether is should be deferred to a subsequent sync time.

In one embodiment, a graphical user interface can be displayed to the user indicating the availability of the update. The user can then indicate whether or not to install the update onto portable computer system 1220. Alternatively, a user can specify preferences with regard to when an update is to be installed. For instance, a user may specify a period of time that must expire before the update is installed, or the user can specify whether or not updates identified as "beta" versions (e.g., updates still being tested) should be automatically installed.

Continuing with reference to FIG. 12, the use of software manager 955 includes the case where an application is beamed from another portable computer (not shown) to portable computer system 1220, but the application is not compatible with the hardware and/or software attributes of portable computer system 1220 and hence cannot be used. In this case, information sufficient for identifying the application can be parsed from the application and saved in portable computer system 1220. During a subsequent synchronization between portable computer system 1220 and computer system 342, software manager 955 can use this information, as well as information regarding the hardware and software attributes of portable computer system 1220, to locate and identify a version of the application compatible with the hardware and software attributes of portable computer system 1220. The application (or the associated components, objects or files) can be installed on portable computer system 1220 as described above in conjunction with FIGS. 10A, 10B and 11.

Figure 13:
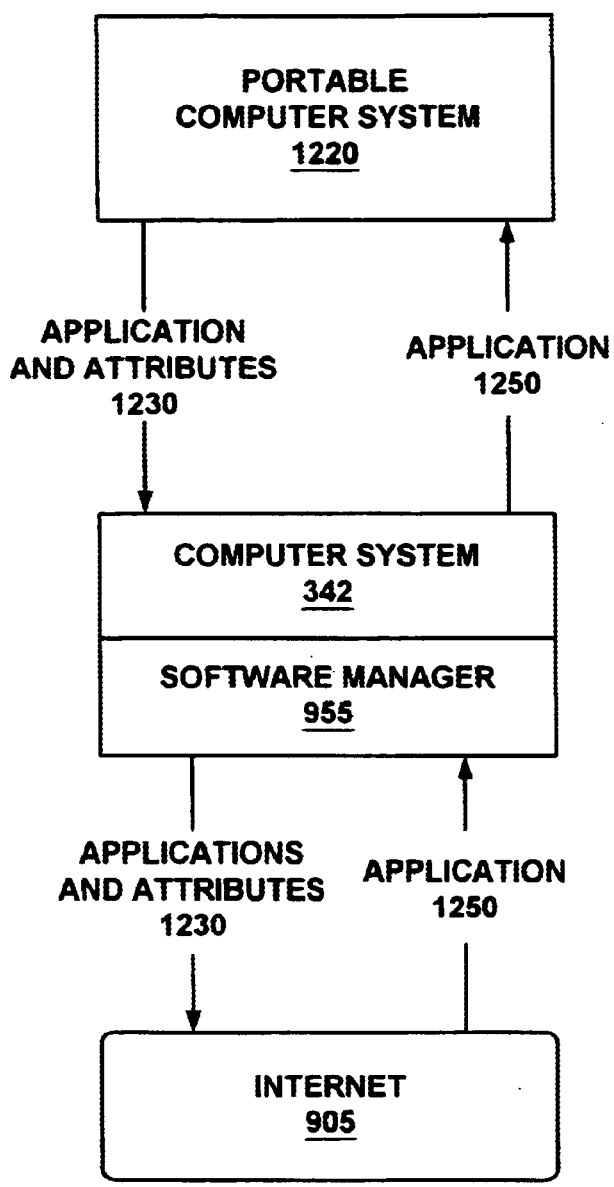
FIG. 13 is a data flow diagram for selecting and updating an application on a portable computer system in accordance with one embodiment of the present invention.

FIG. 13 is a data flow diagram for updating an application 1250 on a portable computer system 1220 in accordance with one embodiment of the present invention. In this embodiment, software manager 955 resides on computer system 342.

In the present embodiment, at sync time, computer system 342 (specifically, software manager 955) receives from portable computer system 1220 information (1230) regarding the applications installed on portable computer system 1220 and also regarding the particular hardware and software attributes of portable computer system 1220. The application information 1230 comprises information such as the type of applications currently installed on portable computer system 1020, their version numbers, and other like sufficient for identifying the applications. Application information 1230 further comprises like information regarding the files, components, or objects associated with the applications installed on portable computer system 1020.

With computer system 342 coupled to the Internet 905, the application and attribute information 1230 is used by software manager 955 to identify whether an updated version of any of the applications (and/or the associated components, objects and files) is available. In the present embodiment, using the application and attribute information 1230, software manager 955 can search application source 915 (FIG. 12) to identify any updates available for installation. Software manager 955 can search a multiplicity of application sources depending on the information provided by portable computer system 1220.

Continuing with reference to FIG. 13, in the present embodiment, an updated version of an application, file, component or object (e.g., application 1250) is retrieved from the Internet 905 using software manager 955, and installed on portable computer system 1220 using host computer system 342.

Figure 14:
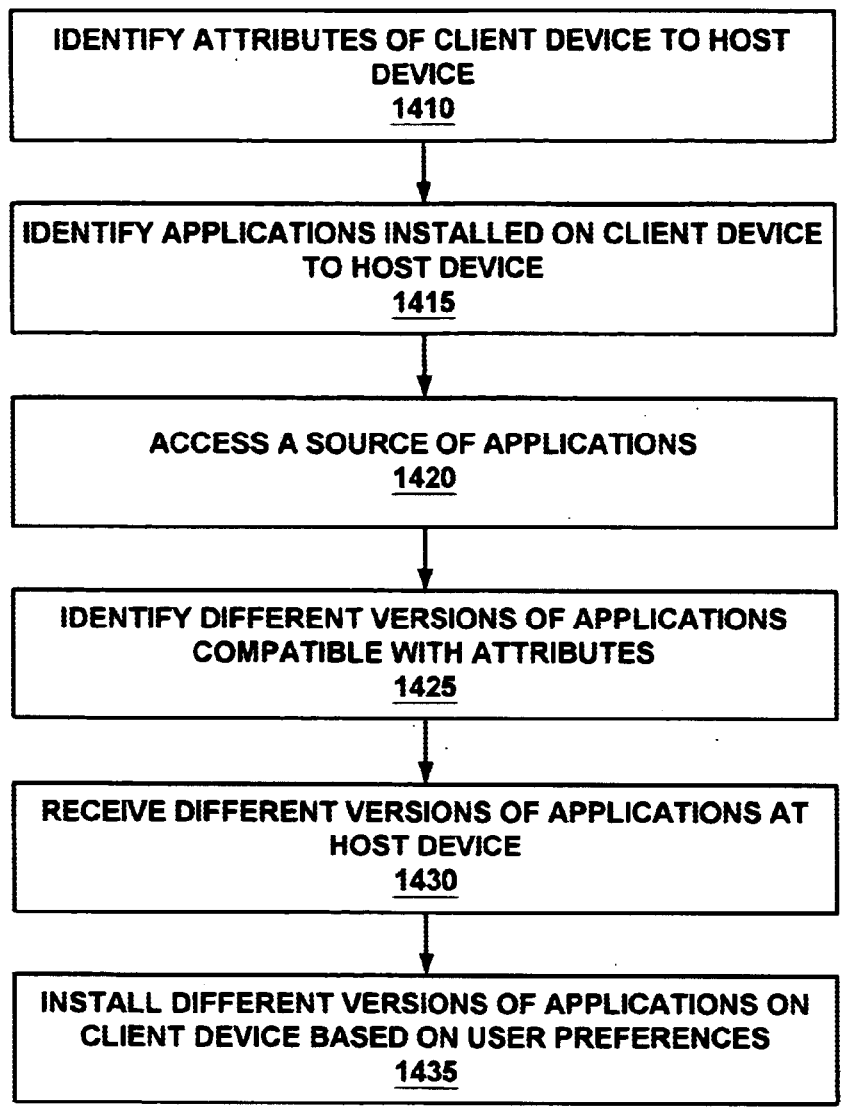
FIG. 14 is a flowchart of the steps in a process for selecting and updating an application on a portable computer system in accordance with one embodiment of the present invention.

FIG. 14 is a flowchart of the steps in a process 1400 for updating an application on a portable computer system (e.g., portable computer system 1220 of FIG. 12) in accordance with one embodiment of the present invention. Process 1400 is implemented by software manager 955 installed on computer system 342 (FIG. 12). It is appreciated that process 1400 may be integrated with the resolver function of software manager 950 (FIG. 9B). It is further appreciated that process 1400 may be integrated with the installer function of system 340 (FIG. 8). In accordance with the present invention, process 1400 is executed automatically, substantially without user intervention, and thus provides a user-friendly mechanism for updating applications on portable computer system 1220.

With reference to FIG. 14 as well as to FIG. 13, in step 1410, in the present embodiment, the hardware and software attributes (e.g., information 1230 regarding the type of processor, operating system, and display device and the amount of memory available) of portable computer system 1220 are communicated to the host device (e.g., computer system 342), typically when portable computer system 1220 and computer system 342 are synchronized (FIG. 8).

In step 1415 of FIG. 14, the applications (and/or the components, objects and files associated with the applications) installed on portable computer system 1220 are also communicated to computer system 342, typically during synchronization. Specifically, information (1230, FIG. 13) sufficient for identifying the applications (e.g., version number, URL, vendor, etc.) is provided to computer system 342.

In step 1420, in the present embodiment, computer system 342 is communicatively coupled with application source 915 (FIG. 12). In this embodiment, application source 915 is automatically selected by software manager 955 based on the application information 1230. In one embodiment, in which application source 915 resides on Internet 905, software manager 955 identifies and accesses application source 915 using a URL, a vendor name, or the like. It is appreciated that a plurality of application sources can be accessed in accordance with the present invention.

In step 1425 of FIG. 14, using the applications and attributes information 1230, software manager 955 can automatically search application source 915 to identify updated versions of the applications, components, objects or files currently installed on portable computer system 1220 and compatible with the hardware and software attributes of portable computer system 1220.

In step 1430, software manager 955 can automatically retrieve updated versions (e.g., application 1250) on behalf of computer system 342. The updated version(s) can then be made ready for installation as described in conjunction with FIGS. 9A and 9B.

In step 1435, the updated version(s) can be automatically installed on portable computer system 1220, depending on user preferences. Alternatively, the installation can be deferred to another time, or the installation can occur only when the user so directs.

Thus, the present embodiment of the present invention provides a method and system thereof that can that can assist a user of a palmtop computer system by locating and identifying a new (updated) version of an application installed on the palmtop. In accordance with the present invention, the search for updates can be performed automatically and thus provides a systematic mechanism for identifying whether an update is available. Accordingly, it is not necessary for a user to regularly search for updates, eliminating the guesswork on the part of the user as to when an update may be available. In addition, it is not necessary for a user to have to recall the source of each of the applications installed on his/her portable computer system. Furthermore, it is not necessary for the user to have knowledge of the particular hardware and software used by his/her portable computer system. The present embodiment of the present invention also can provide a user-friendly mechanism for installing an updated application onto a palmtop using a host computer system when, for example, the update is retrieved from a source such as the WWW.

The preferred embodiment of the present invention is thus described. While the present invention has been described in particular embodiments, it should be appreciated that the persent invention should not be construed as limited by such embodiments, but rather construed according to the below claims.

What is claimed is:

1. In a host device, a method for installing an application on a client device communicatively coupled to said host device, said method comprising the computer-implemented steps of:

a) receiving at said host device a description of said application from a client device on which said application is to be installed, wherein said description was received by said client device from another client device;

b) communicating to a source a specification comprising said description; and c) receiving from said source a software element characterized by said specification, wherein said software element is for said application;

wherein said steps a), b) and c) are automatically performed without user intervention.

2. The method as recited in claim 1 further comprising the step of:

d) installing said software element on said client device.

3. The method as recited in claim 1 wherein said client device is a portable computer system.

4. The method as recited in claim 1 wherein said step a) comprises the step of:

transferring said description to said client device from said other client device using a wireless link.

5. The method as recited in claim 1 wherein said step b) comprises the steps of:

identifying a version of said application in said description; and including in said specification an identification of said version.

6. The method as recited in claim 5 wherein said step c) comprises the steps of:

determining that a more recent version of said application is available from said source; and receiving from said source a software element corresponding to said more recent version.

7. The method as recited in claim 1 wherein said step b) comprises the steps of:

identifying attributes of said client device; and including in said specification identification of said attributes.

8. The method as recited in claim 7 wherein said attributes are hardware attributes.

9. The method as recited in claim 7 wherein said attributes are software attributes.

10. The method as recited in claim 1 wherein said step c) comprises the step of:

receiving billing information for said software element.

11. The method as recited in claim 1 further comprising the steps of:

decompressing said software element when said software element is in a compressed format; and identifying said software element as ready for installation on said client device.

12. A method for installing an application on a client device, said method comprising the steps of:

sending a description of said application from a client device on which said application is to be installed to a host device, said description sufficient for identifying said application but separate from said application, wherein a software manager on said host device communicates to a source a specification comprising said description and wherein said host device receives from said source a software element characterized by said specification;

synchronizing said client device and said host device, wherein said software manager makes said software element ready for installation on said client device; and receiving and installing said software element at said client device;

wherein said software manager functions automatically without user intervention.

13. The method as recited in claim 12 wherein said client device is a portable computer system.

14. The method as recited in claim 12 further comprising the step of:

receiving said description from another client device using a wireless link.

15. The method as recited in claim 12 wherein said communicating step comprises the step of:

identifying a version of said application in said description; and including in said specification an identification of said version.

16. The method as recited in claim 12 wherein said communicating step comprises the step of:

identifying an attribute of said client device; and including in said specification an identification of said attribute.

17. The method as recited in claim 16 wherein said attribute is a hardware attribute of said client device.

18. The method as recited in claim 16 wherein said attribute is a software attribute of said client device.

* * * * *

UNITED STATES PATENT AND TRADEMARK OFFICE
CERTIFICATE OF CORRECTION

PATENT NO.    : 6,701,521 B1
DATED         : March 2, 2004
INVENTOR(S)   : Guy McIlroy, Roger Flores and Steve Lemke It is certified that error appears in the above-identified patent and that said Letters Patent is hereby corrected as shown below:

<u>Title page,</u>
Item [75], Inventors, should read -- Guy McIlroy, Roger Flores and Steve Lemke --

Signed and Sealed this

Eighteenth Day of May, 2004

JON W. DUDAS
*Acting Director of the United States Patent and Trademark Office*